(12) United States Patent
Vigna

(10) Patent No.: US 12,294,597 B2
(45) Date of Patent: May 6, 2025

(54) METHOD OF IMPLEMENTING ENTERPRISE CYBER REPORTS

(71) Applicant: David Michael Vigna, Sterling, VA (US)

(72) Inventor: David Michael Vigna, Sterling, VA (US)

( * ) Notice: Subject to any disclaimer, the term of this patent is extended or adjusted under 35 U.S.C. 154(b) by 202 days.

(21) Appl. No.: 17/658,746

(22) Filed: Apr. 11, 2022

(65) Prior Publication Data

US 2022/0377092 A1 Nov. 24, 2022

Related U.S. Application Data

(63) Continuation-in-part of application No. 15/929,388, filed on Apr. 30, 2020, now Pat. No. 11,301,241.

(60) Provisional application No. 62/862,997, filed on Jun. 18, 2019.

(51) Int. Cl.
*H04L 29/06* (2006.01)
*G06F 11/30* (2006.01)
*G06Q 50/26* (2012.01)
*H04L 9/40* (2022.01)

(52) U.S. Cl.
CPC ....... *H04L 63/1425* (2013.01); *G06Q 50/265* (2013.01); *H04L 63/1416* (2013.01); *H04L 63/1433* (2013.01)

(58) Field of Classification Search
CPC ............. H04L 63/1425; H04L 63/1433; H04L 63/1416; G06Q 50/265
See application file for complete search history.

(56) References Cited

U.S. PATENT DOCUMENTS

| 10,645,122 | B2 * | 5/2020 | Purusothaman | .... H04L 63/0263 |
| 2015/0128274 | A1 * | 5/2015 | Giokas | .................. H04L 51/212 726/23 |
| 2016/0337400 | A1 * | 11/2016 | Gupta | ................. H04L 63/1416 |
| 2017/0324759 | A1 * | 11/2017 | Puri | ..................... G06F 11/3476 |

OTHER PUBLICATIONS

Gnana Jagathese Chelladurai, Significance of Firewall and Its Practicality in Corporate Environment , May 2019, [Retrieved on Nov. 20, 2024]. Retrieved from the internet: <URL: https://repository.bothouniversity.ac.bw/buir/bitstream/handle/123456789/109/JAGS_FINAL_PWD.pdf?> 115 Pages (1-115) (Year: 2019).*

\* cited by examiner

*Primary Examiner* — Anibal Rivera
(74) *Attorney, Agent, or Firm* — Dunlap Bennett & Ludwig, PLLC

(57) ABSTRACT

A method for generating enterprise cyber reports through linking IP access control logic with error handler and audits compartmentalized by web application for different user groups with multiple monitoring tools data. Business logic may be defined in access control tables for multiple user groups sharing multiple different application data and programmable access control logic applied to subfolders within the website subfolders based on functional user group role permissions. A common network event field name may be used to map multiple different monitoring tools data into common field alias. The field alias mapping allows multiple networking capture tools to be included within the same cyber report. Joining multiple network events field alias with an IP location allows for groups of different IP zone reports to be created within the enterprise being monitored by different monitoring tools.

10 Claims, 5 Drawing Sheets

METHOD OF IMPLEMENTING ENTERPRISE CYBER REPORTS

CROSS-REFERENCE TO RELATED APPLICATION

This application claims the benefit of priority of U.S. provisional application No. 62/862,997, filed 18 Jun. 2019, and claims benefit of priority of U.S. non-provisional patent application Ser. No. 15/929,388, filed 30 Apr. 2020, now U.S. Pat. No. 11,301,241, as a continuation-in-part, the contents of both are herein incorporated by reference.

BACKGROUND OF THE INVENTION

The present invention relates to enterprise cyber reports and, more particularly, a method of generating enterprise cyber reports through linking IP access control logic with error handler and audits compartmentalized by web application for different user groups with multiple monitoring tools data.

Enterprise web applications may be supported by multiple development teams. There needed to be a method to compartmentalize error and access audit reports for each application team and protect applications that include sensitive data from leakage between teams.

An enterprise's cyber team normally sees a whole enterprise view of the network or subnet that they are monitoring with network tools and do not have an insight into a web applications' business logic or users' functional access logic. The cyber team may use tools like WireShark, NMap, ELK, Snort™, Splunk™, or CrowdStrike™, just to name a few local and cloud-based network and event monitoring tools. The enterprise's development teams normally do not have an insight into those network logs or network reports outside the scope of the server logs. The cyber team may only reach out to the development team when a breach happens, which may be too late.

Error and audit logs may have shown abnormal events happening for months, but without defined business logic, the cyber team may be looking for a needle in a haystack of network log files. However, system intrusion detection tools need alerts to be defined to work correctly.

Disadvantageously, current cyber monitoring tools may see the actions and events on the network but not know the business logic of what normal or abnormal usage is for multiple user groups. When new users are added, they may only use port references to access the website. However, when a developer is added to the development team, the new IP address may set off a false alert since the developer may use FTP or remote desktop ports per their job duties or a custom port for connection different from the normal end users' connections. The standard and suboptimal method of communication between the cyber and development teams is a firewall request form or email.

There are limits to storing and scanning network data. Products like Snort™ can be configured to store events in database tables, while other tools like Splunk™ and CrowdStrike™ provide an API to query data in an interface to view network events. However, those simple tools do not define multiple user group actions on the same web resources. Too many times, people think artificial intelligence (AI) will define and catch abnormal actions in web applications, but baselines need to be defined for abnormal and normal usage. However, using web application logs alone will not define all abnormal events, and network traffic is not captured in the web application logs alone, even with the use of AI. For instance, network-firewall traffic, web server, and database traffic are outside the web application log files.

As can be seen, there is a need for a method of generating enterprise cyber reports through linking IP access control logic with error handler and audits compartmentalized by web application for different user groups with multiple monitoring tools data.

The present invention embodies a rules-based model that allows the functional and technical teams to define access controls and policies within the web framework. Those rules are programmatically applied to configuration files that control folder and file access based on user authentication, different functional user groups, and approved program ports and connection methods, including GEO IP Zones, VPN Groups, Subnets, or locking down the user to individual workstations if required.

Those access control tables are also used to create cyber event reports by linking the logic to error and audit data creating access control reports. The developer teams can use those reports for user management and compliance reporting.

The cyber teams can use the reports to review business logic and configure firewall rules or alerts using the separate abnormal (errors) events from normal (audits) usage. Those cyber reports can loosely define an access control baseline for multiple user groups with different access levels for each application that includes the functional business logic in an easily readable report. This format allows review of access controls for the different teams supporting multiple web applications within an enterprise.

The rule-based model embodies a method for generating a proactive report that could assist both teams in defining business logic and providing an insight to both parties for securing sensitive web applications and shared dashboards.

The error and audit logs can be used to create a normal operations baseline, creating extra business logic by defining users, functional job duties, access methods, IP, subnets, and ports. The cyber team can then define firewall and network traffic logic to create more detailed alerts for normal and abnormal actions.

There needs to be a proactive approach to cyber event reporting that includes multiple applications and different user group logic with shared web servers and applications. Event baselines can be created for different user groups by linking the Error and Audit reports to different user groups for each web application. This can help both the cyber and development teams protect sensitive data within those different applications.

To illustrate, a ColdFusion™ web server may employ enterprise error and access audits spanning across multiple servers, cloud vendors, or dockers. It should be understood that even though the instant specification discloses the present invention in the context of an Adobe™ ColdFusion™ web server, the present invention applies to a wide array of web development systems. Likewise, the present invention is not limited to only CFML (Cold Fusion Markup Language), as CFML is only an example source to demonstrate the methods and need for a different approach in creating web development frameworks.

SUMMARY OF THE INVENTION

In one aspect of the present invention, a method for implementing an enterprise cyber report for multiple user groups sharing web applications, the method includes the following: defining a set of rules indicative of a normal event for the multiple user groups and linking one or more network error and audit tables to each of the web applications, wherein each of the one or more network error and audit tables are compartmentalized by web application for each user group with multiple monitoring tools.

In another aspect of the present invention, the above-mentioned method further includes wherein defining the set of rules is provided through an access control table for the multiple user groups, wherein the set of rules is programmable access control logic applied to a plurality of subfolders and files within the respective web application, wherein the application of programmable access control logic is based on functional user group role permissions, wherein the application of programmable access control logic is based on functional user group role permissions; further including mapping a network event field name of each data element of the monitoring tools data set into a field alias; further including joining the network event data set field names with an IP location; further including generating a cyber report comprising a normal event baseline for the multiple user groups based on said set of rules, wherein the cyber report comprising an abnormal event baseline for the multiple user groups based on said set of rules, and wherein the cyber report comprising a definition of one or more firewall alerts based on the abnormal event baseline.

In one aspect of the present invention, a method for method for implementing enterprise cyber reports for a plurality of user groups sharing web applications, the method includes the following: defining a set of rules indicative of a normal event for the plurality of user groups; and linking one or more network data sets with error and audit tables to each of the web applications, wherein each of the one or more network data sets are linked to error and audit tables that are compartmentalized by web application for each of the user groups with a plurality of monitoring tools data, wherein defining the set of rules is provided through an access control table for each of the plurality of user groups, wherein the set of rules comprises an application of programmable access control logic applied to subfolders or files within the respective web application, wherein the application of programmable access control logic is based on functional user group role permissions; further including mapping a network event field name of each data element of each of the plurality of monitoring tools data into a common field alias; further including joining network traffic and event data with an IP location linked to a user; further including generating a cyber report comprising a normal event baseline for the plurality of user groups based on said set of rules, wherein the cyber report comprises an abnormal event baseline for the plurality of user groups based on said set of rules, wherein the cyber report comprises a definition of one or more firewall alerts based on the normal and abnormal event baselines.

These and other features, aspects, and advantages of the present invention will become better understood with reference to the following drawings, descriptions, and claims.

BRIEF DESCRIPTION OF THE DRAWINGS

FIG. 5 is a workflow diagram illustrating the new method for login and page security checks—AppRoleZones & AppFolderFileRoles.

DETAILED DESCRIPTION OF THE INVENTION

Figure 1A:
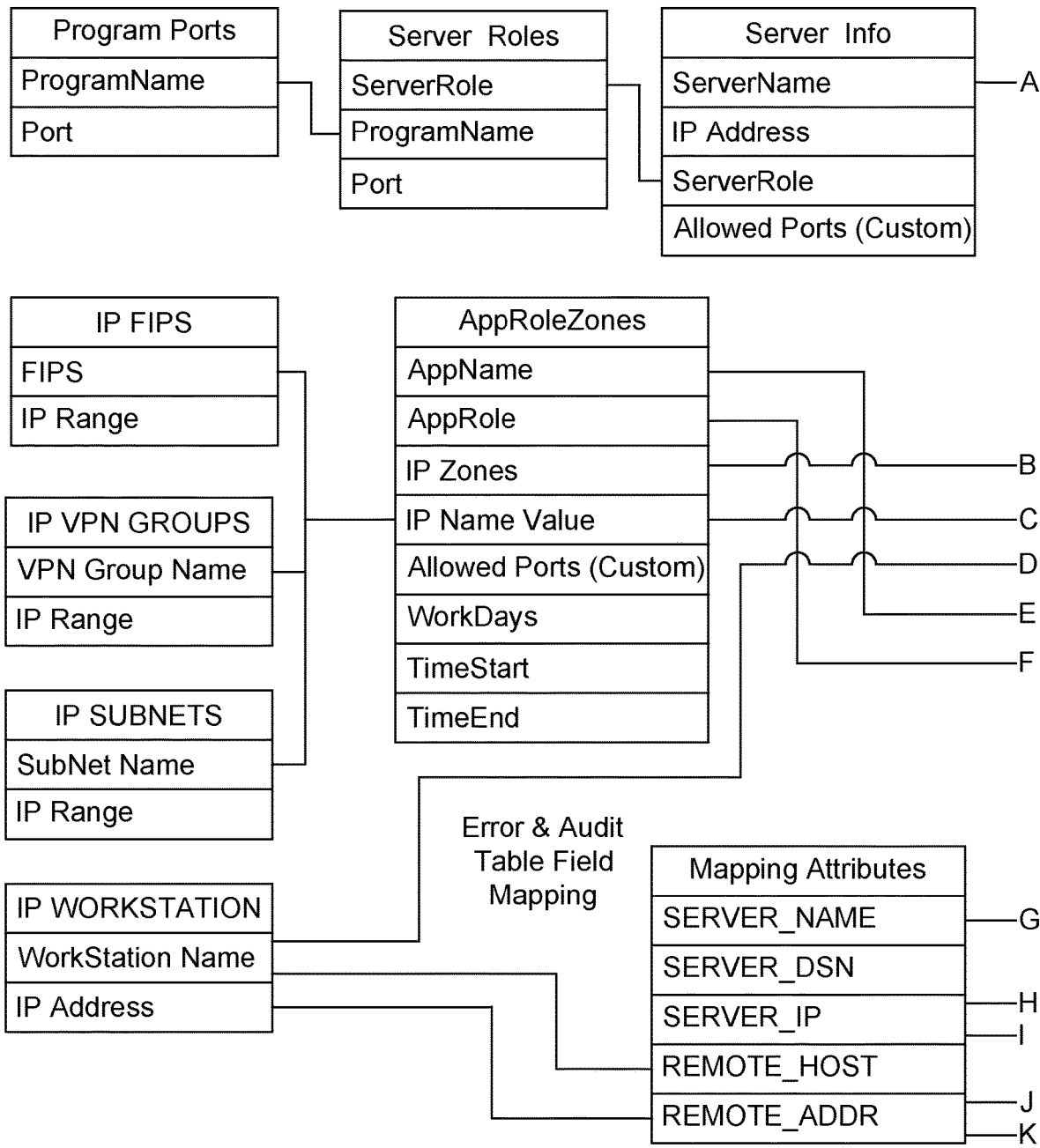
FIG. 1 is an enterprise relationship diagram (ERD) illustrating defining the Server Environment, Apps, Roles and IP Zones to Restrict Folder and File Access, and Network Monitoring Tool Attribute Mapping to Error and Audit Table Fields for Cyber Reports. In this ERD example, with approved IP zones and zero trust lockdown to a user's workstation, views may be created to improve process performance. For instance, using a loose IP zone (FIPS IP, VPN, or Subnets) with IP ranges or a workstation zero trust model, enables clients to create different access controls per their security policies.
FIG. 1C is a flow chart of an exemplary embodiment of the present invention.
Figure 1C:
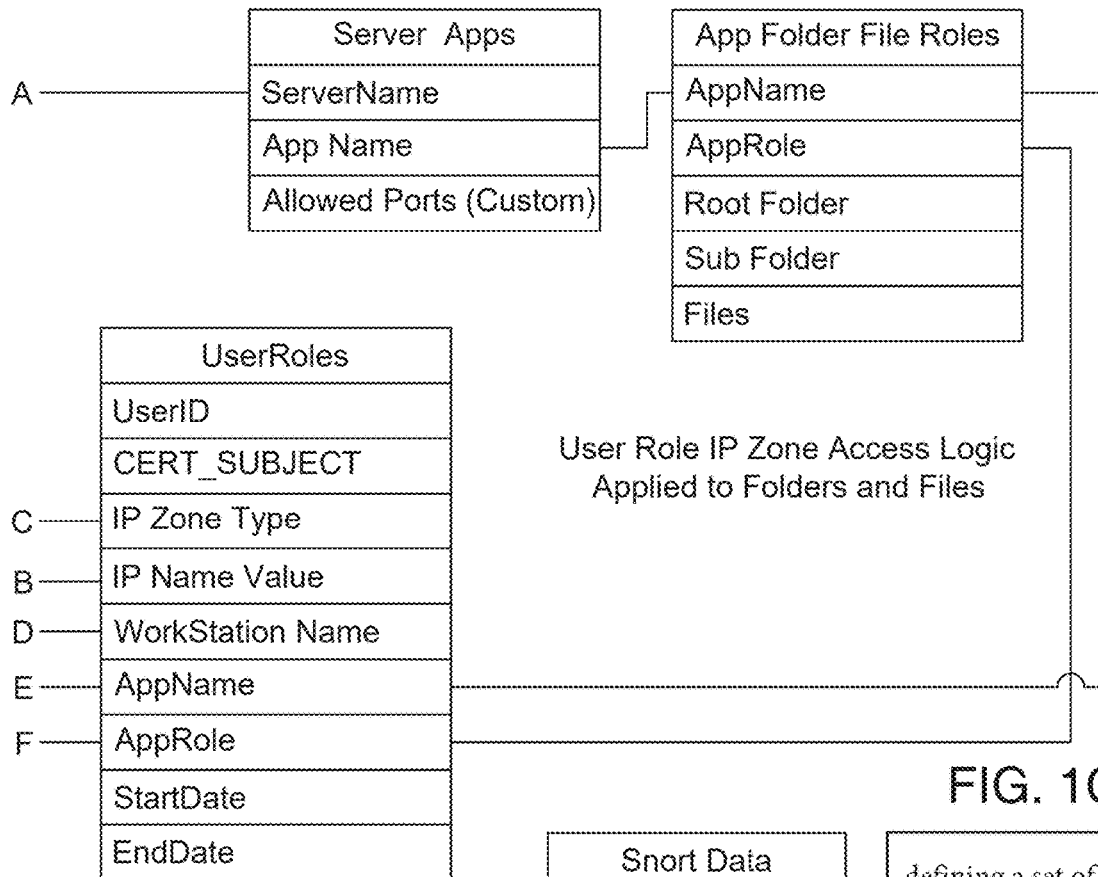
Figure 1B:
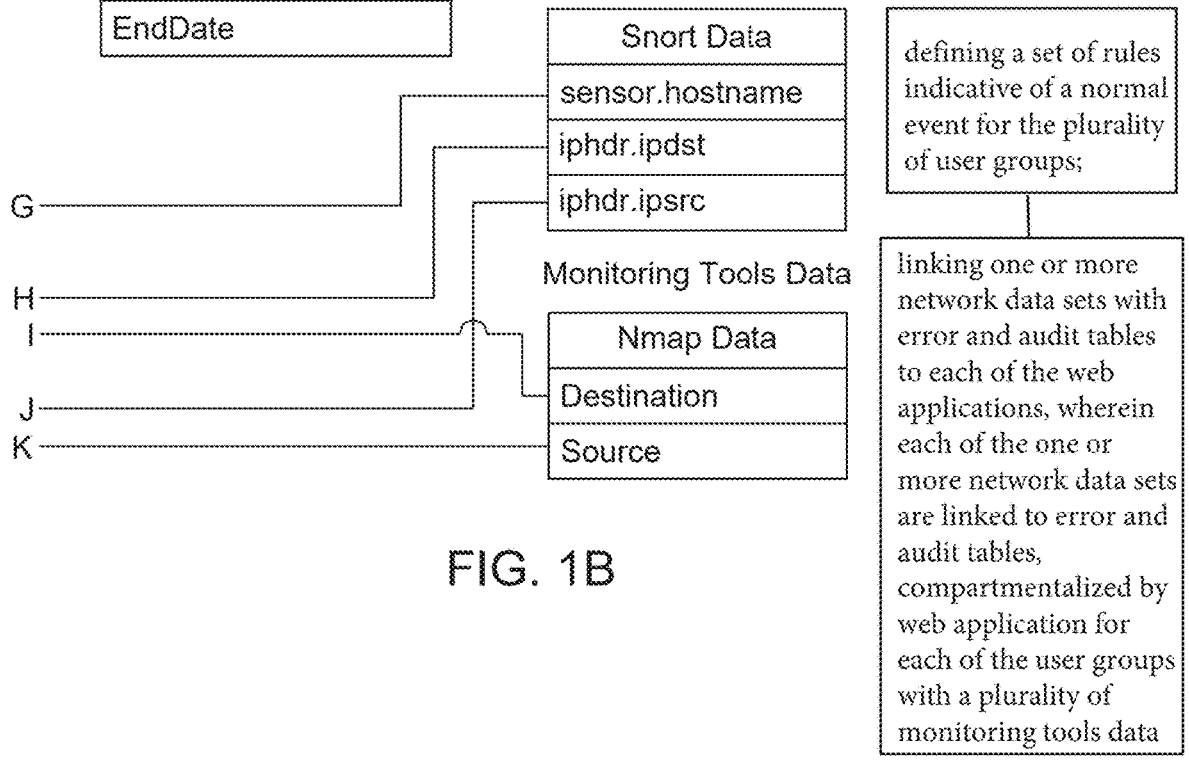
Figure 2:
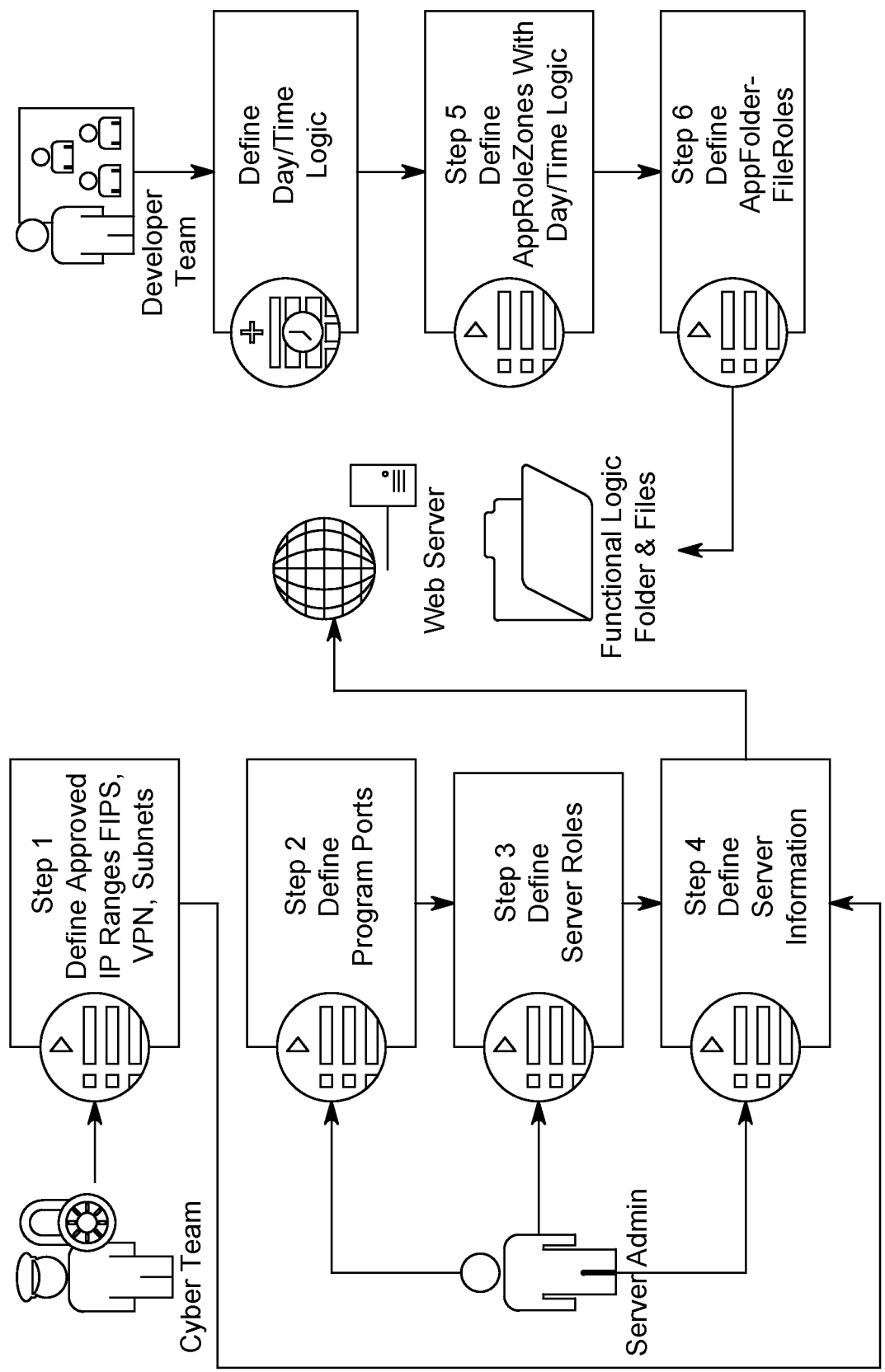
FIG. 2 is a workflow diagram illustrating a new method to define IP zone roles, server & app setup, and day/time logic-AppRoleZones & AppFolderFileRoles.
Figure 3:
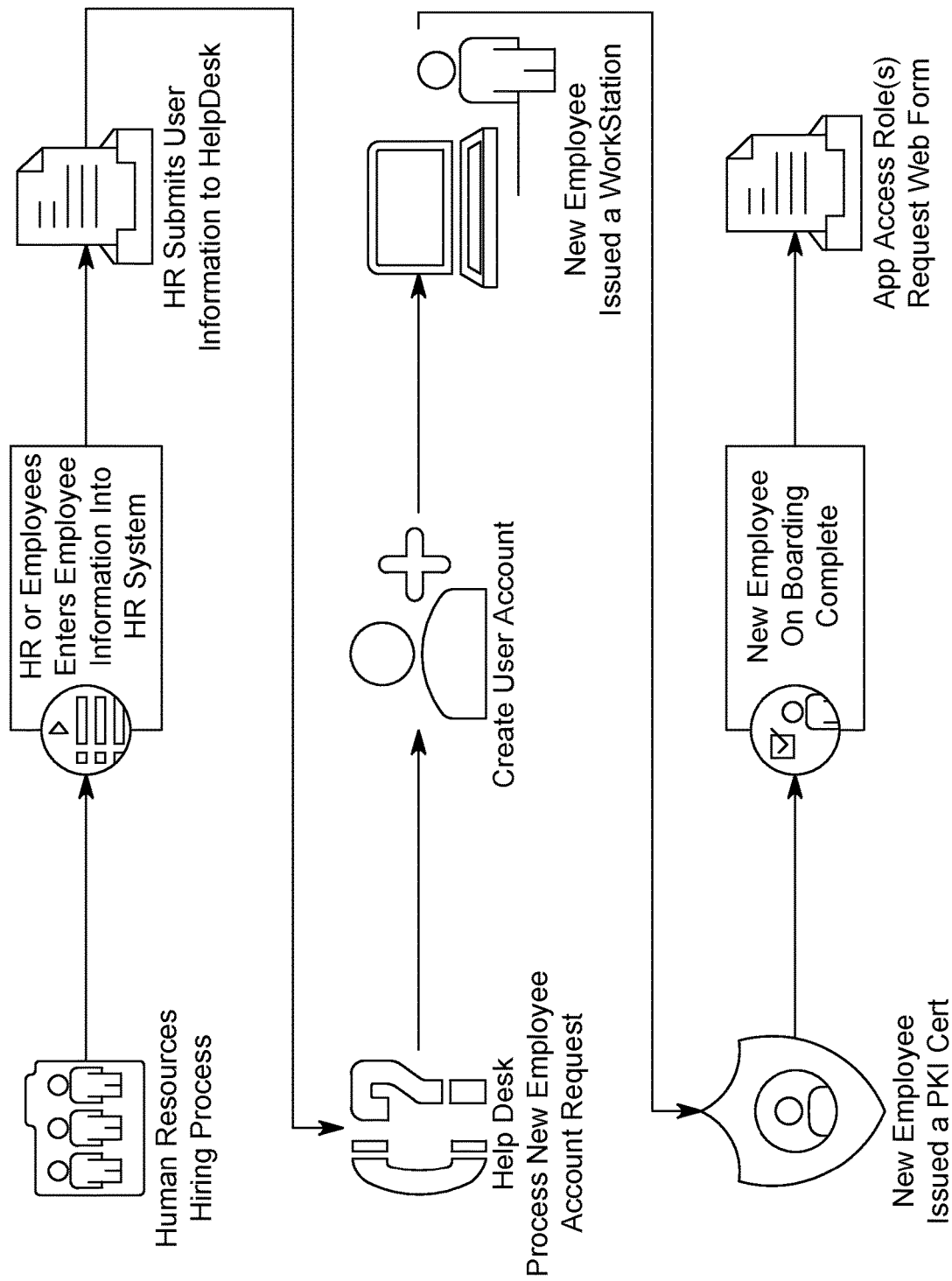
FIG. 3 is a workflow diagram illustrating a normal HR onboarding process with an app role(s) request.
Figure 4:
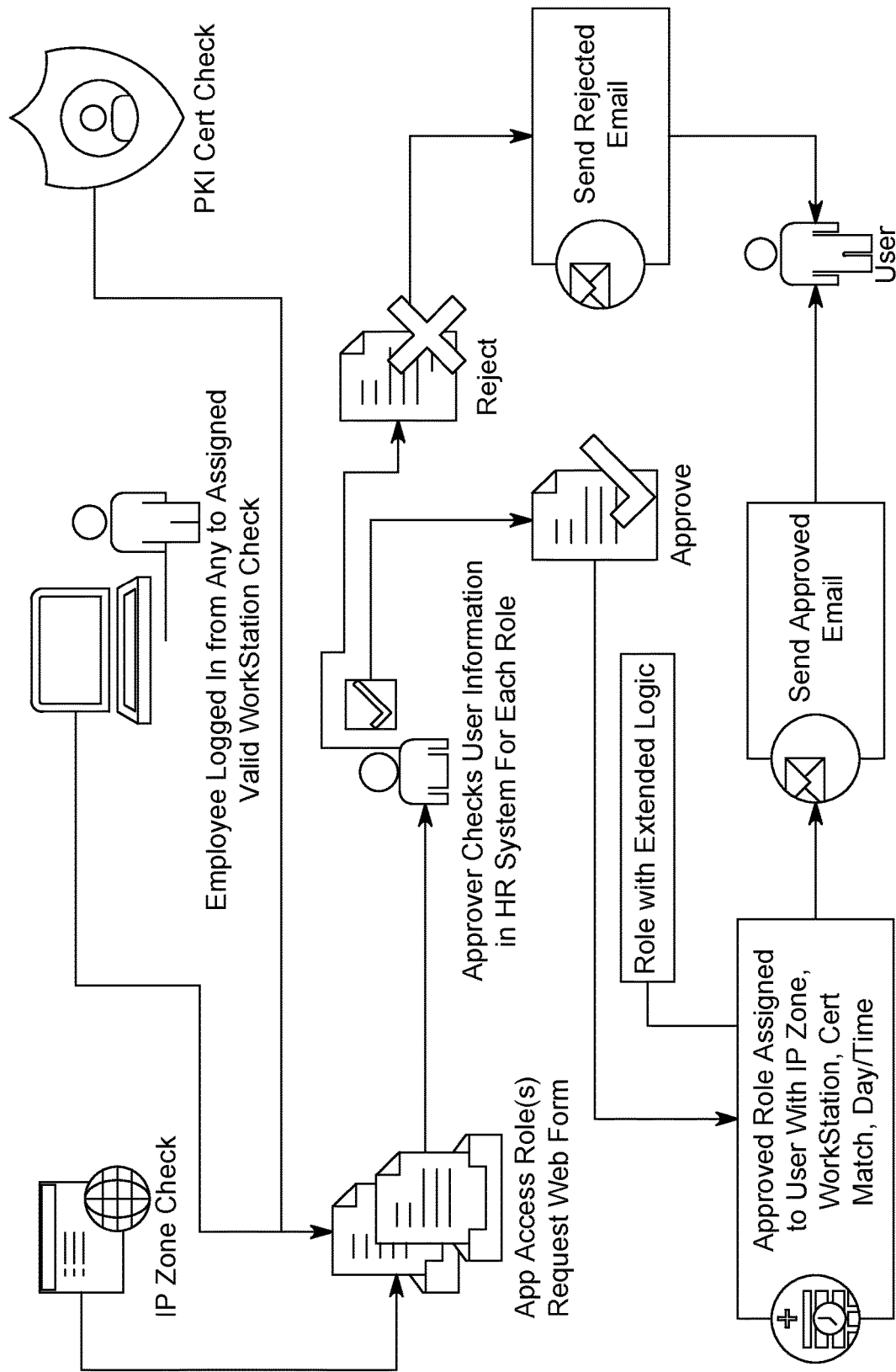
FIG. 4 is a workflow diagram illustrating new method employee request app access for each role zone.

The following detailed description is of the best currently contemplated modes of carrying out exemplary embodiments of the invention. The description is not to be taken in a limiting sense but is made merely to illustrate the general principles of the invention since the scope of the invention is best defined by the appended claims.

By defining functional group logic (ex., Server, Admin, Power Users, Developers, and Testing teams) as opposed to the standard user's actions, one may be able to see the different IP/port endpoints, traffic patterns, and defined approved traffic for each user group.

With the error and audit reports, normal and abnormal behavior can be defined for different user groups. Reports can be created to display different group usage or errors per application.

Network monitoring tools may be configured to output to XML, JSON, or other file formats for other programs to import and read. Simple output logs and/or ELK may be used by the Cyber Teams to look for issues. Additionally, normal and abnormal actions need to be defined for the rules to work correctly.

The development team can add new developers or users with special access needs to the Frameworks Users tables and assign group roles per their job duties. The cyber team can be emailed when the form is submitted to update the cyber team to allow access from a new workstation to any current firewall rules. The cyber team can also run reports to confirm that their firewall rules match the business logic within the framework embodied in the present invention. Also, more frequent compliance reports can be run for users with elevated privileges by checking business logic against IP Zone and allowed working time logic for each of the user groups.

The inventive framework stores the business logic for each user group. Those reports can be viewed by both the cyber and development teams for compliance, and the reports create an audit trail for changes. This allows cyber teams to check their configuration rules of network resources for any compromise of information assurance and help identify network issues.

The addition of the defining IP range information for user groups with approved program ports can clearly define the approved network traffic. Those reports can be used to define the business logic for network and firewall configuration and for business compliance and policy reviews by all parties involved in systems security.

Each user group will have a defined set of actions and a subset of actions that indicate normal behavior. By linking Error Handling and Audits tables to those cyber rules for each user group, normal and abnormal events can be queried in reports.

Again, too many times, people think AI will define and catch abnormal actions; the grouping of different user types and event actions within the model can assist with defining accepted traffic logic and creates a baseline for abnormal and normal usage. Those cyber event trends and reports can be reviewed and allow for defining firewall rules, and network alerts with user-group-defined baseline data to improve the firewall rules and alerts.

Defining user types, IP zones, port protocols, and other variables for different web applications and user groups to limit access to functional folders and files creates business logic for admin pages, data modeler folders, etc., and defines access controls. This applies access controls using IP zones and VPN IP ranges or workstation lockdown for different groups, protecting sensitive folders and/or files by limiting access to approved IPs. For example, a developer's office workstation during normal working hours.

ColdFusion™ allows one to lock the server admin pages by restricting them to specific IP addresses. This framework expands that and provides an extra check within the application scope of each of the application's functional folders and allows for an additional time check for working hours. This extra check can be added on the pages or folder scope to restrict access to approved roles and the approved IP bypassing the user information into queries on page load. The framework tables store the business logic used within the security tables in the framework and address different functional subfolders, approved users, and group access logic with approved IP/port information.

The following is an example of restricting access to the same users, such as employees checking their own HR information from home. One may not want them to have access to the HR admin pages unless they are logged into the site using a VPN or at their desk. Another example may be having a rule that limits report developers to only work from a VPN group with a defined IP range or computers located at the office from their assigned desk. By linking the network events log files or a network event data repository to error and audits data, the framework can create reports for normal and abnormal usage.

Those reports use the business logic defined in the access control tables for approved traffic per user group and application. The reports can filter on approved users and/or matched IP addresses versus out of range IP addresses and ports trying to access the web or database servers.

In sum, by linking application logging to another network event data source, the framework can provide insight into issues across different environments, and network objects that the application relies on for the website to load successfully. This framework provides a more complete cyber event report by linking the data in the Error and Audit tables compartmentalized and grouped by application team. The cyber reports can help identify and pinpoint what happened, how it happened, and pinpoint any access control issues with applications with sensitive data used by multiple user groups with different network traffic logic.

Forms and Tables

Forms are used to capture and load tables that define the business logic for each different application's user group. Security files are programmatically created, setting variables used to query the security logics tables and control access to folders and files based on functional permission groups.

Those tables allow for the creation of predefined reports that can be customized by each client creating reports linking network-cyber event data to the Error and Audit reports. Clients will be able to pick from multiple network event data sources for a flexible reporting solution.

The core tables that define the business logic and access controls for the framework are described at a high level without primary and foreign keys, and the table name and fields, and data are examples to demonstrate the disclosure:

| Program Ports Table | |
|---|---|
| Program Name | Port |
| FTPS | 22 |
| HTTPS | 443 |
| HTTPS | 8443 |
| MSSQL | 1433 |
| mySQL | 3306 |
| Oracle | 1521 |
| Windows Remote Desktop | 3389 |

This table stores the approved programs and port numbers used by the enterprise. This is a custom table the Server Admin needs to enter per the approved software allowed on the network.

| Server Roles Table | | |
|---|---|---|
| Server Role | Program Name | Port |
| WebServer | FTPS | 22 |
| WebServer | HTTPS | 443 |
| WebServer | HTTPS | 8443 |
| WebServer | Windows Remote Desktop | 3389 |
| Database -MSSQL | MSSQL | 1433 |
| Database -MSSQL | Windows Remote Desktop | 3389 |
| Database -mySQL | mySQL | 3306 |
| Database -mySQL | Windows Remote Desktop | 3389 |
| Database -Oracle | Oracle | 1521 |
| Database -Oracle | Windows Remote Desktop | 3389 |

There is a form that updates this table that includes the approved programs. The Server Admin defines the roles and approved software allowed with a form based on the policy of the enterprise. This table stores the generic ports with the server's primary role. Examples can include web or database, or file server.

| Server Info Table | | | |
|---|---|---|---|
| Server Name | IP Address | Server Role | Allowed Ports (Custom) |
| Server01 | 10.XXX.XXX | Web Server | 22, 443, 3389 |
| Server02 | 10.XXX.XXX | Database - Oracle | 1521, 3389 |

A form updates this table data, which includes the server hostname, primary role, IP address, and custom ports. Server Admins can remove programs or ports once they select the server's primary role.

| IP FIPS | |
|---|---|
| FIPS (Country, State, City Code) | IP Range |
| US | 63.XXX.XXX to XXX.XXX.XXX |
| FR | 103.XXX.XXX to 104.XXX.XXX |

| IP VPN Groups | |
| --- | --- |
| VPN Group Name | IP Range |
| US - Server Admins | 68.10.XXX |
| US - Developer | 68.20.XXX |
| FR - Developer | 68.22.XXX |
| FR - Managers | 68.32.XXX |
| US - Employees | 68.30.XXX |
| FR - Employees | 68.33.XXX |

| IP SubNets | |
| --- | --- |
| SubNet Name | IP Range |
| Tech Building | 10.XXX.100-125 |
| HR Building | 10.XXX.130-140 |

| IP WorkStations | |
| --- | --- |
| WorkStation Name | IP Range |
| DBA WorkStation | 10.XXX.111 |
| Data Modeler WorkStation | 10.XXX.112 |

| Server Apps Table | | |
| --- | --- | --- |
| Server Name | App Name | Allowed Ports (Custom) |
| Server01 | HR Time Tracking | 22, 443, 3389 |
| Server02 | HR Time Tracking | 1521, 3389 |

There is a form that updates this table data, which includes the allowed ports on the server, but also lists each application with a custom port to further restrict access to each custom application with a custom port list.

| AppRoleZones Table | | | | | | | |
| --- | --- | --- | --- | --- | --- | --- | --- |
| AppName | AppRole | WorkDays | Time Start | Time End | IP Zones (FIPS Country/VPN Group Etc) | IP Range | Allowed Ports (Custom) |
| Time | Server Admin On-Site | M, T, W, T, F | 6 am | 9 pm | US - Tech Building | 10.XXX.100-105 | 22, 443, 3389 |
| Time | Server Admin Off-Site | S, M, T, W, T, F, S | 12 am | 12 pm | US Off Site | 68.10.XXX | 443, 3389 |
| Time | DBA On-Site | M, T, W, T, F | 6 am | 9 pm | US - Tech Building | 10.XXX.111 | 1521, 3389 |
| Time | Data Modeler On-Site | M, T, W, T, F | 6 am | 9 pm | US - Tech Building | 10.XXX.112 | 443 |
| Time | Developer On-Site | M, T, W, T, F | 6 am | 9 pm | US - Tech Building | 10.XXX.120-125 | 443, 3389 |
| Time | Developer Off-Site | S, M, T, W, T, F, S | 12 am | 12 pm | US - Developer Off Site | 68.20.XXX | 443 |
| Time | Developer Off-Site (FR) | S, M, T, W, T, F, S | 12 am | 12 pm | FR - Developer Off Site | 68.22.XXX | 443 |
| Time | Power User (Manager) | S, M, T, W, T, F, S | 12 am | 12 pm | US - HR Building | 10.XXX.130-140 | 443 |
| Time | Power User (Manager) (FR) | S, M, T, W, T, F, S | 12 am | 12 pm | FR - VPN Managers | 68.32.XXX | 443 |
| Time | Employee | S, M, T, W, T, F, S | 12 am | 12 pm | US - VPN Employees | 68.30.XXX | 443 |
| Time | Employee (FR) | S, M, T, W, T, F, S | 12 am | 12 pm | FR - VPN Employees | 68.33.XXX | 443 |

This expands the Server and Application Table with user groups and IP or IP ranges, allowing for custom IP and Port controls for different user groups. An example may be an On-Site or Off-Site role with work time checks for admin or developers.

| | | | | |
|---|---|---|---|---|
| App Folder File Roles Table | | | | |
| AppName | AppRoles | Root Folder | Sub Folder | Files |
| HR Time Tracking | Server Admin On-Site | HR-Time | HR-Time/ADMIN | AddUser.cfm |
| HR Time Tracking | Server Admin Off-Site | HR-Time | HR-Time/ADMIN | ReviewUser.cfm |
| HR Time Tracking | Data Modeler On-Site | HR-Time | HR-Time/DATAMODELS | CreateModel.cfm |
| HR Time Tracking | Developer On-Site | HR-Time | HR-Time/DATAMODELS | ReviewModel.cfm |
| HR Time Tracking | Developer On-Site | HR-Time | HR-Time/REPORTS | CreateReport.cfm |
| HR Time Tracking | Developer On-Site | HR-Time | HR-Time/DASHBOARDS | CreateDashboard.cfm |
| HR Time Tracking | Developer Off-Site | HR-Time | HR-Time/REPORTS | ViewReport.cfm |
| HR Time Tracking | Developer Off-Site | HR-Time | HR-Time/DASHBOARDS | ViewDashboardLayout.cfm |
| HR Time Tracking | Developer Off-Site (FR) | HR-Time | HR-Time/DASHBOARDS | EditDashboardLayout.cfm |
| HR Time Tracking | Power User (Manager) | HR-Time | HR-Time/DASHBOARDS | ViewDashboard.cfm |
| HR Time Tracking | Power User (Manager) (FR) | HR-Time | HR-Time/DASHBOARDS | ViewDashboard.cfm |
| HR Time Tracking | Employee | HR-Time | HR-Time/DASHBOARDS | ViewDashboard.cfm |
| HR Time Tracking | Employee (FR) | HR-Time | HR-Time/DASHBOARDS | ViewDashboard.cfm |

A form updates this table data, which includes the application folders and allowed App Roles. This table is used to create the extra security logic and checks for IP zones or IP ranges, custom-allowed web ports, and allows for access checks for each folder. A security file is used to query the current remote host's IP and access method, along with checking day and time restrictions.

| | |
|---|---|
| UsersRoles Table Fields (High Level) | |
| Field Name | Description |
| USERID | This field stores the custom defined userid assigned by the organization |
| CERT_SUBJECT | This field stores cert that is in the CGI CERT_SUBJECT |
| VPN Group Name | This field stores the VPN group the user should use |
| SubNet Name | This field Stores the SubNet location for the user's workstation |
| WorkStation Name | This field stores the workstation name, which is assigned to a SubNet |
| AppRole | This field stores the AppRole(s) name that is assigned to the user. |
| AppRoleStartDate | This field stores the AppRole Start Date that is assigned to the user. |
| AppRoleEndDate | This field stores the AppRole End Date that is assigned to the user. |

The connection method for each user is gathered during the approval process based on what connection permissions are assigned to each role. Some fields may be blank examples, VPN, or CERT_SUBJECT based on the role requirements defined by the organization.

Network Event Attributes Mapping

| | |
|---|---|
| ColdFusion CGI Server - Source and Target DNS or IP Address and Port | |
| SERVER_NAME | Server's hostname, DNS alias, or IP address as it appears in self-referencing URLs. |
| SERVER_PORT | Port number to which the request was sent. |
| REMOTE_HOST | Hostname making the request. If the server does not have this information, it sets REMOTE_ADDR and does not set REMOTE_HOST. |
| REMOTE_ADDR | IP address of the remote host making the request. |

CGI variables are used in the Error and Audit tables of the disclosure, and the variable and field names do not match for different monitoring tools. Each network monitoring tool has different names for some of the CGI variables used to capture network event data. Some common attributes are the source and target IP addresses and ports. Snort breaks the protocol for the ports into two different tables; other tools store this as a simple protocol column with the value of TCP or UDP.

| |
|---|
| Snort-mySQL Table.Field |
| sensor.hostname |
| iphdr.ipsrc |
| iphdr.ipdst |
| tcphdr.tcp_sport |
| tcphdr.tcp_dport |
| udphdr.udp_sport |
| udphdr.udp_dport |

Nmap uses a simple one line of data in a row, and the fields are as in the next figure.

| Nmap | | |
|---|---|---|
| Destination | Source | Protocol |

By mapping the attributes into a table with a common field alias, multiple networking tools can be mapped to join to the ColdFusion variables. This example is just a high level of some of the data that ColdFusion can capture. While a few more variables can be used, but to explain this mapping, I will use the SERVER_NAME and REMOTE variables.

In ColdFusion, the CGI variables put DNS and IP address in the same variable called CGI SERVER_NAME. This application uses a logic check to split and store this variable into different columns. The ERRORS and AUDITS tables will be modified to separate a valid DNS and valid IP with SERVER_NAME, catching what does not pass the valid DNS or IP checks. The ERRORS and AUDITS tables will then have the SERVER_DSN and SERVER_IP fields that the cyber reports can use for joining data to create reports using the mapping model. Those mapping joins will easily be grouped to create IP Zone views that can be filtered and grouped based on DSN names or IP ranges for both developers and cyber teams to support the web application.

Logic Checks on Some CGI Variables Allows for Custom Mapping of Different Monitoring Tools

| CGI Variables Used Error and Audit Table | New Reporting Columns For DSN or IP Zone Reporting | Nmap | Snort |
|---|---|---|---|
| SERVER_NAME | SERVER_NAME | | |
| | SERVER_DSN | | sensor.hostname |
| | SERVER_IP | Destination | iphdr.ipdst |
| REMOTE_HOST | | | |
| REMOTE_ADDR | | Source | iphdr.ipsrc |

This mapping table also allows multiple monitoring tools to be used in the same report without linking to the Error or Audit tables if the cyber team needs any custom reports.

Cyber Event Data—File Version ETL

The cyber team needs to grant access to logs or output data filtering by to the application network objects. Let's say we are still talking about an HR system with an HR Time application.

Step 1

The cyber team would start NMap, WireShark, or Snort filtering and monitoring on the Web Server and the HR Time application with the output flag set to a readable format by ColdFusion.

The cyber team would start NMap, WireShark, or Snort filtering and monitoring the HR Time Server database and any other application resources with the output flag set to a readable format by ColdFusion

*Note: if multiple applications use the same network resources, there is only a need to pull that data in once.

Step 2

The output files can be copied into a folder with permissions so the ColdFusion server can read, copy, or rename and move the files to an archive folder as it processes the log files.

Step 3

The application or cyber team would use the network file form within the framework to define the XML, JSON, or other readable files to map the data file field names to the standard field names used within the framework. Each tool may use a different field naming for common fields, so the framework field names need to be mapped for the reports to work correctly.

Step 4

A scheduled task can be created in ColdFusion to run the framework files that process the data and load the data stored in a database table. Views are created to join the Network events and Error and Audits with the business logic tables looking for trends between Errors and Audits issues and gathering information pinpointing issues with information assurance and troubleshooting network issues more proactively.

Cyber Event Data—Database or API ETL

Step 1

The cyber team would grant access to the database, for example, Snort, or provide the API login information for ELK, Splunk, CrowdStrike, or other monitoring tools. The API can be filtered to provide limited output to only the network objects required for each application.

Step 2

The cyber team and developers for each application team need to confirm the output from the API or database queries to confirm the data pulled is limited to the network objects for each Application.

*Note: if multiple applications use the same network object, there is only a need to pull that data in once.

Step 3

The cyber team and developers would use the network database or API form in the Framework to define the database fields, API, or JSON return field mapping the standard field names within the framework. Each tool may use a different field naming for common fields, so the framework fields need to be mapped for the reports to work correctly.

Step 4

A scheduled task can be created for a ColdFusion™ to run the framework files that process the data that can be stored in a database table within the Framework to look for trends between errors and audits. This allows for troubleshooting network issues in a more proactive manner.

Website logs are limited and include error and audit events from the enterprise's endpoints monitoring tools. Those cyber reports can help define business logic used by both development and cyber teams to secure applications with sensitive data. Those reports can create a baseline report for normal (audits) and abnormal (error) reports when linked to the network/cyber event data. They also can assist with compliance audits and firewall rules and alerts for the cyber teams.

By linking the cyber event time reports to the error handling and audits reports, one will see actions outside the scope of just the web server logs. The reports use defined, approved business logic for different group usage allowing the cyber team to create more detailed firewall alerts. The reports also create an abnormal and normal usage baseline for multiple user groups that share multiple applications on the same web server, database, or file servers.

Business logic is defined in access control tables for multiple user groups sharing multiple different application data and programmable access control logic applied to subfolders within the website subfolders based on functional user group role permissions, with IP zones and logic checks and allows for web items access to be controlled. Examples can include menu items, dashboard panels, page sections but are not limited to those web page items but any object that can be inside a security container that checks tables for role access.

The ordered combination of various ad hoc and automated tasks in the presently disclosed platform necessarily achieves technological improvements through the specific processes described in more detail below. In addition, the unconventional and unique aspects of these specific automation processes represent a sharp contrast to merely providing a well-known or routine environment for performing a manual or mental task.

It should be understood, of course, that the foregoing relates to exemplary embodiments of the invention and that modifications may be made without departing from the spirit and scope of the invention as set forth in the following claims.

What is claimed is:

1. A collaborative workflow method for functional and technical teams to proactively improve cyber security of a computer network for a plurality of user groups sharing web applications over the computer network, the collaborative workflow method comprises:
   providing network traffic monitoring tools to each user group of the plurality of user groups, through which each team of the functional and technical teams independently defines a set of access rules indicative of at least one normal event for each of said shared web application for each user groups
   linking each set of access rules with error and audit tables of an associated shared web application, wherein the error and audit tables are configured to be compartmentalized by the shared web applications;
   creating one or more allowed and normal usage baselines for each user group by comparing network traffic against each set of access rules defined by the user group; and
   defining one or more firewall rules on a user-group basis based on the one or more allowed and normal usage baselines.

2. The collaborative workflow method of claim 1, wherein defining the set of rules is provided through an access control table for each of the plurality of user groups.

3. The collaborative workflow method of claim 2, wherein the set of rules comprises an application of programmable access control logic applied to subfolders or files within the respective web application.

4. The collaborative workflow method of claim 3, wherein the application of programmable access control logic is based on functional user group role permissions.

5. The collaborative workflow method of claim 4, further comprises mapping a network event field name of the computer network of each data element of each of the plurality of monitoring tools data into a common field alias.

6. The collaborative workflow method of claim 5, further comprises joining network traffic of the computer network and event data with an IP location linked to a user.

7. The collaborative workflow method of claim 6, further comprises generating a cyber report comprising the allowed and normal usage baselines for the plurality of user groups.

8. The collaborative workflow method of claim 7, wherein the cyber report comprises an abnormal event baseline for the plurality of user groups based on said set of rules.

9. The collaborative workflow method of claim 8, wherein the cyber report comprises a definition of one or more firewall alerts based on the allowed and normal usage baselines.

10. The collaborative workflow method of claim 1, further comprising applying access control to business logic of each shared web application so that each firewall rule matches the associated business logic.

* * * * *